United States Patent
Zhang

(10) Patent No.: US 10,489,117 B2
(45) Date of Patent: Nov. 26, 2019

(54) METHOD AND APPARATUS FOR GENERATING RANDOM CHARACTER STRING

(71) Applicant: ALIBABA GROUP HOLDING LIMITED, Grand Cayman (KY)

(72) Inventor: Xinyu Zhang, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 16/000,146

(22) Filed: Jun. 5, 2018

(65) Prior Publication Data
US 2018/0285078 A1    Oct. 4, 2018

Related U.S. Application Data

(63) Continuation of application No. PCT/CN2016/108198, filed on Dec. 1, 2016.

(30) Foreign Application Priority Data

Dec. 7, 2015    (CN) .......................... 2015 1 0892216

(51) Int. Cl.
*G06F 7/58* (2006.01)
*G06F 16/903* (2019.01)
*G06F 17/00* (2019.01)

(52) U.S. Cl.
CPC .......... *G06F 7/58* (2013.01); *G06F 16/90344* (2019.01); *G06F 17/00* (2013.01)

(58) Field of Classification Search
CPC ....... G06F 7/58; G06F 16/90344; G06F 17/00

USPC .................................................. 708/250–256
See application file for complete search history.

(56) References Cited

U.S. PATENT DOCUMENTS

| | | | |
|---|---|---|---|
| 5,805,911 A * | 9/1998 | Miller | G06F 17/276 715/234 |
| 7,218,252 B2 | 5/2007 | Fauque | |
| 9,317,949 B2 * | 4/2016 | Miyamoto | G09B 29/106 |
| 9,454,753 B2 | 9/2016 | Wohied et al. | |
| 9,665,864 B2 | 5/2017 | Prakash et al. | |

(Continued)

FOREIGN PATENT DOCUMENTS

| | | | |
|---|---|---|---|
| CN | 101533435 A | | 9/2009 |
| CN | 101976241 A | * | 2/2011 |

(Continued)

OTHER PUBLICATIONS

International Search Report and Written Opinion for Application No. PCT/CN2016/108198, dated Feb. 27, 2018, 9 pages.

(Continued)

*Primary Examiner* — Tan V Mai

(57) ABSTRACT

Method and apparatus for generating a random character string are disclosed. The method comprises: acquiring a value of a sequence number variable in a database, wherein the value of the sequence variable is a sequence comprising basic numerals in a basic numeral set, and the acquired value of the sequence variable is different from values of the sequence variable acquired at any other times; and mapping the sequence into a character string as a generated random character string according to an one-to-one mapping relationship between characters contained in a character set and the basic numerals contained in the basic numeral set.

20 Claims, 4 Drawing Sheets

S101. Acquire a value of a sequence variable in a database, wherein the value of the sequence variable is a sequence comprising basic numerals from a basic numeral set, and the acquired value of the sequence variable is different from values of the sequence variable acquired at any other times S102: Map the sequence into a character string as a generated random character string according to an one-to-one mapping relationship between characters contained in a character set and the basic numerals contained in the basic numeral set

(56) References Cited

U.S. PATENT DOCUMENTS

| | | |
|---|---|---|
| 2002/0099936 A1 | 7/2002 | Kou et al. |
| 2004/0015702 A1 | 1/2004 | Mercredi et al. |
| 2006/0173931 A1 | 8/2006 | Broadhurst |
| 2006/0229864 A1 | 10/2006 | Suontausta et al. |
| 2007/0018862 A1 | 1/2007 | Cho |
| 2007/0139233 A1 | 6/2007 | Matsuda |
| 2009/0138474 A1 | 5/2009 | Guo et al. |
| 2009/0328146 A1 | 12/2009 | Lee |
| 2011/0153717 A1 | 6/2011 | Fitterer et al. |
| 2013/0159173 A1 | 6/2013 | Sivaraman et al. |
| 2014/0266818 A1 | 9/2014 | Laviolette |
| 2016/0253220 A1 | 9/2016 | Cai et al. |
| 2018/0084032 A1 | 3/2018 | Potlapally et al. |

FOREIGN PATENT DOCUMENTS

| | | | |
|---|---|---|---|
| CN | 101976241 A | | 2/2011 |
| CN | 104363584 A | * | 2/2015 |
| CN | 104363584 A | | 2/2015 |
| JP | 2004-514996 A | | 5/2004 |
| WO | 2014/134447 A1 | | 9/2014 |

OTHER PUBLICATIONS

Extended European Search Report dated May 6, 2019 issued in European Application No. 16872350.0 (8 pages).
Schwartz, "How to Find Next and Previous Records in SQL", Sep. 26, 2006, retrieved from the internet: URL: https://www.xaprb.com/blog/2006/04/28/how-to-find-next-and-previous-records-in-sql/ (3 pages).
Examination Report No. 1 for Australian Application No. 2016367801, dated Mar. 1, 2019 (3 pages).
First Search dated Aug. 21, 2018 issued in Chinese Application No. 201510892216.8 (1 page).
International Preliminary Report on Patentability for Application No. PCT/CN2016/108198 dated Jun. 12, 2018, (9 pages).
First Office Action dated Sep. 5, 2018 issued in Chinese Application No. 201510892216.8 with English machine translation (15 pages).
Second Office Action dated Feb. 19, 2019 issued in Chinese Application No. 201510892216.8 with English machine translation (15 pages).
Notice to Submit Response for Korean Application No. 10-2018-7018758 dated Jul. 29, 2019 (10 pages).
Office Action for Japanese Application No. 2018-548262 dated Jun. 11, 2019 (6 pages).

* cited by examiner

METHOD AND APPARATUS FOR GENERATING RANDOM CHARACTER STRING

CROSS REFERENCE TO RELATED APPLICATIONS

The present application is a continuation application of International Patent Application No. PCT/CN2016/108198, filed on Dec. 1, 2016, which claims priority to Chinese Patent Application No. 201510892216.8 filed on Dec. 7, 2015 and entitled "Method and Apparatus for Generating Random Character String." The above-referenced applications are incorporated herein by reference in their entirety.

TECHNICAL FIELD

The present application relates to the electronic digital data processing field, and in particular, to a method and an apparatus for generating a random character string.

BACKGROUND

Random character strings have been extensively used in many services (e.g., communication services, transaction services, etc.). For example, services with an extensive use of random character strings can be a service comprising a cryptographic process, a service that needs to label a large amount of service data, and the like.

At present, to prevent confusion among service data, it is typically required that random character strings used by a service are unique in the scope of the service, namely the random character strings should be different from each other.

According to existing technologies, a random algorithm is typically used to generate random character strings. Moreover, a currently generated random character string is compared with random character strings generated previously. If they are the same, the currently generated random character string is discarded, and a random character string is further generated. As such, each of the generated and saved random character strings is unique among all random character strings (for ease of description, the random character string can be referred to as a unique random character string).

When there is a large number of generated and saved random character strings, however, the operation to compare character strings needs to be carried out for many times when generating a random character string to prevent having identical random character strings. Therefore, this method for generating a unique random character string has a very low efficiency.

SUMMARY

Embodiments of the present disclosure provide a method and an apparatus for generating a random character string to at least mitigate the low efficiency problem in current technologies for generating a unique random character string.

According to one aspect, a method for generating a random character string comprises: acquiring a value of a sequence number variable in a database, wherein the value of the sequence variable is a sequence comprising basic numerals from a basic numeral set, and the acquired value of the sequence variable is different from values of the sequence variable acquired at any other times; and mapping the sequence into a character string as a generated random character string according to an one-to-one mapping relationship between characters contained in a character set and the basic numerals contained in the basic numeral set.

According to another aspect, an apparatus for generating a random character string comprises: an acquiring module configured to acquire a value of a sequence number variable in a database, wherein the value of the sequence variable is a sequence comprising basic numerals from a basic numeral set, and the acquired value of the sequence variable is different from values of the sequence variable acquired at any other times; and a generating module configured to map the sequence into a character string as a generated random character string according to an one-to-one mapping relationship between characters contained in a character set and the basic numerals contained in the basic numeral set.

According to another aspect, a non-transitory computer-readable storage medium may store instructions that, when executed by a processor, cause the processor to perform a method for generating a random character string, the method comprising: acquiring a value of a sequence number variable in a database, wherein the value of the sequence variable is a sequence comprising basic numerals from a basic numeral set, and the acquired value of the sequence variable is different from values of the sequence variable acquired at any other times; and mapping the sequence into a character string as a generated random character string according to an one-to-one mapping relationship between characters contained in a character set and the basic numerals contained in the basic numeral set.

According to another aspect, a system for generating a random character string may comprise a processor and a non-transitory computer-readable storage medium storing instructions that, when executed by the processor, cause the system to perform a method for generating a random character string, the method comprising: acquiring a value of a sequence number variable in a database, wherein the value of the sequence variable is a sequence comprising basic numerals from a basic numeral set, and the acquired value of the sequence variable is different from values of the sequence variable acquired at any other times; and mapping the sequence into a character string as a generated random character string according to an one-to-one mapping relationship between characters contained in a character set and the basic numerals contained in the basic numeral set.

With the above at least one technical solution provided by the embodiments of the present disclosure, a different value of the sequence variable is acquired each time, and correspondingly, a different random character string is generated each time according to the one-to-one mapping relationship. Therefore, it is not necessary to perform an operation of character string comparison for many times, thereby improving the efficiency of generating a unique random character string.

BRIEF DESCRIPTION OF THE DRAWINGS

The accompanying drawings described herein are used to provide a further understanding of the present disclosure and constitute a part of the present disclosure. Exemplary embodiments of the present disclosure and the description thereof are used to describe the present disclosure, and do not constitute an improper limitation to the present disclosure. In the accompanying drawings.

DETAILED DESCRIPTION

To make the objectives, technical solutions, and advantages of the present disclosure clearer, the technical solutions of the present disclosure will be clearly and completely described below with reference to various embodiments of the present disclosure and the accompanying drawings. Apparently, the described embodiments are merely some, rather than all, of the embodiments of the present disclosure. All other embodiments obtainable by a person skilled in the art on the basis of the embodiments of the present disclosure and without inventive effort shall fall within the scope of the present disclosure.

As mentioned in the Background, a posterior manner is used to generate a unique random character string according to existing technologies (i.e., generating a random character string first, and then checking if the random character string is unique), to ensure that the generated and saved random character strings are unique. For a random character string generated at a time, the random character string would be discarded if the random character string is the same as any of the saved random character strings. In such case, the efficiency is very low, and moreover, resources for generating random character strings would be squandered.

To solve the above problem, a measure can be taken at the source of a process of generating a random character string in the embodiments of the present disclosure, such that a generated random character string is unique. As such, there is no need to check after the random character string is generated, and the efficiency would be high. Moreover, resources for generating random character strings would not be squandered. A detailed description will be provided below.

Figure 1:
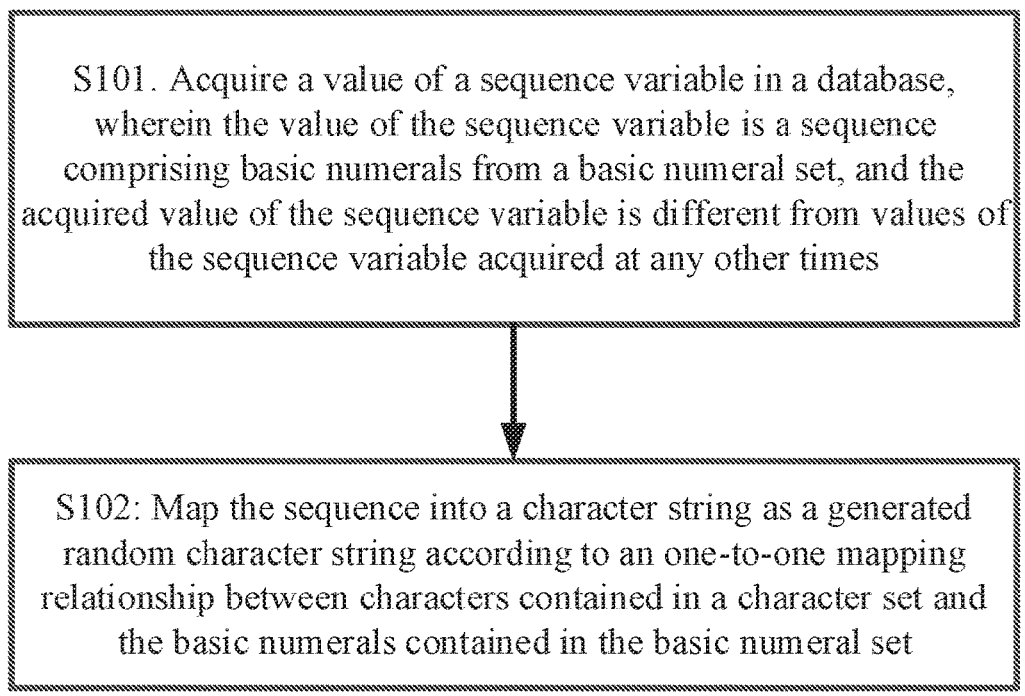
FIG. 1 illustrates a process of a method for generating a random character string according to various embodiments of the present disclosure.

FIG. 1 illustrates a process of a method for generating a random character string according to some embodiments of the present disclosure. A main body to execute this process can comprise a terminal or a server. The terminal includes, but is not limited to, a personal computer, a mobile phone, a tablet computer, a smart watch, a vehicle-mounted mobile station, and the like; the server includes, but is not limited to, a personal computer, a large or medium-scale computer, a computer cluster, and the like. The execution main body does not constitute a limitation to the present disclosure. For ease of description, the embodiments of the present disclosure are all described with the execution main body being a server as an example.

In some embodiments, the process in FIG. 1 can be a process of generating a unique random character string. In a practical application, the process can be executed for a number of times to acquire a plurality of random character strings that are different from each other. The process can be executed in a single point environment, or can be executed in a distributed environment; the execution environment of the process is not limited in the embodiments of the present disclosure.

In one example, the process can comprise the following steps:

S101: acquiring a value of a sequence variable in a database, wherein the value of the sequence variable is a sequence comprising basic numerals from a basic numeral set, and the acquired value of the sequence variable is different from values of the sequence variable acquired at any other times.

In some embodiments, the sequence variable can be any defined sequence variable in the database. The sequence variable can be defined for achieving the function of generating a random character string, or can be defined originally for achieving another function, which will not be limited by the embodiments of the present disclosure. The database includes, but is not limited to, Oracle, DB2, PostgreSQL, and the like.

The sequence variable can be used as a primary key of the database. When an instruction provided by the database is used to acquire the value of the sequence variable, the acquired value of the sequence variable can be different each time. The instruction can be used to allow an auto increment of the sequence variable according to a preset auto increment step, and then acquire the value of the sequence variable, e.g., the NextVal instruction.

In some embodiments, a random character string generated according to an acquired value of the sequence variable can be ensured to be unique on the basis that a unique value of the sequence variable is acquired each time.

In some embodiments, since the above instruction is a functional part of the database that has been achieved, no additional functional module needs to be developed, when the solution of the present disclosure is implemented, so as to ensure that a different value of the sequence variable is acquired each time in the step S101, thereby reducing the implementation cost of the solution of the present disclosure.

In some embodiments, the sequence variable is a numeric variable. The value of a numeric variable can be expressed by a decimal number, a binary number, an octal number, or a hexadecimal number. A sequence variable with a name of "seq" will be used as an example for description.

In a decimal system, assuming that seq=123, then the value of seq can be expressed by a sequence "123" formed by decimal numerals 1, 2, and 3 on the basis of a basic numeral set corresponding to the decimal system (the included basic numerals are decimal numerals of 0 to 9), namely a decimal number of 123; in a binary system, the value of seq can be expressed by a sequence "01111011" formed by binary numerals 0 and 1 on the basis of a basic numeral set corresponding to the binary system (the included basic numerals are binary numerals of 0 and 1), namely a binary number of 01111011; similarly, the value of seq can be expressed based on an octal system or a hexadecimal system, which will not be described one by one herein.

As described above, the basic numeral set in the step S101 can be a predetermined basic numeral set corresponding to a predetermined numeral system, and correspondingly, the value of the sequence variable can be a sequence comprising basic numerals in the basic numeral set.

S102: mapping the sequence into a character string as a generated random character string according to an one-to-one mapping relationship between characters contained in a character set and the basic numerals contained in the basic numeral set.

In some embodiments, the number of characters contained in the character set can be the same as the number of the basic numerals contained in the basic numeral set, the characters can be different from each other, and the basic numerals can be different from each other. As such, a one-to-one mapping relationship can be successfully set between the characters and the basic numerals.

The character set and/or the one-to-one mapping relationship can be set prior to the execution of the step S101, or can be set after the execution of the step S101. In the former case, when the step S101 is executed, the character set is determined prior to the determination of the value of the sequence variable. To ensure that a one-to-one mapping relationship can be successfully set between the character set and the basic numeral set corresponding to the value of the sequence variable, the basic numeral set used to express the value of the sequence variable can be determined according to the number of characters contained in the character set (the number of the basic numerals contained in the basic numeral set should be equal to the number of characters); in the latter case, similarly, the character set can be set according to the number of the basic numerals contained in the basic numeral set used to express the value of the sequence variable.

In some embodiments, after the sequence is mapped into a character string, moreover, other characters may be inserted to the head, middle, or tail of the character string according to a preset rule, and then the character string after the insertion is used as a generated random character string. In such a case, the character string mapped from the sequence can be a part of the generated random character string. In some embodiments, the inserted other characters may not affect the uniqueness of the generated random character string.

In some embodiments, in addition to the use of a preset character set to map the sequence, a preset character string set can similarly be used to map the sequence to generate a random character string. In such a case, the step S102 can be replaced by the following step: mapping the sequence into a character string as a generated random character string according to a preset one-to-one mapping relationship between character strings contained in a character string set and the basic numerals contained in the basic numeral set.

According to the method above, a different value of the sequence variable is acquired each time, and correspondingly, a different random character string is generated each time according to the one-to-one mapping relationship. Therefore, it is not necessary to perform an operation of character string comparison for many times, thereby improving the efficiency of generating a unique random character string and saving resources of a server. Moreover, since an instruction has been provided by the database to acquire a different value of the sequence variable each time, the implementation cost of the solution of the present disclosure is relatively low, which favors the implementation in more applicable scenarios.

To facilitate the understanding, the steps in FIG. 1 will be further described below.

In some embodiments, different services may have different requirements for the complexity of a generated random character string. For example, one service's requirements can be satisfied by generating a random character string only comprising English letters, while another service may require that a generated random character string not only comprises English letters, but also comprises other types of characters, such as numbers, punctuations, and the like.

According to requirements such as those described above, a character set that meets the requirements can be set first, and then the steps in FIG. 1 are carried out. In such case, according to the set character set, a basic numeral set that is in a one-to-one mapping relationship with the character set can be determined, so as to express a value of the sequence variable in the step S101.

If there is no special requirement for the complexity of the generated random character string, a value of the sequence variable can be acquired first, and then according to the basic numeral set expressing the value, a character set in a one-to-one mapping relationship with the basic numeral set can be generated.

In some embodiments, a server can generate a random character string for only one service or for a plurality of services respectively. In the latter case, the plurality of services all have a demand for acquiring a random character string. Since each of the plurality of services typically uses the acquired random character string only in the scope of the service, a server can generate, for each service, a random character string that is unique in the scope of the service. It is not necessary to ensure that all random character string generated by the server are globally unique.

According to the analysis of the latter case, the "acquiring a value of a sequence variable in a database" in the step S101 can comprise: receiving a generation request for generating a random character string; according to the type of the generation request, determining a preset sequence variable that corresponds to the type from at least one sequence variable in the database; acquiring a value of the sequence variable corresponding to the type, wherein the acquired value of the sequence variable is different from values of the sequence variable corresponding to the type that are acquired at any other times.

The generation request for generating a random character string can come from a service that needs to acquire a random character string, and different services can have different types of generation requests. Each type of generation request can correspond to a sequence variable (the corresponding relationship can be preset or can be set after receiving a generation request), and each sequence variable has a different variable name. As a result, sequence variables can be differentiated according to variable names.

Therefore, a server can generate, for different services, random character strings that are unique in corresponding service scopes, respectively, on the basis of different sequence variables. As such, each sequence variable can be prevented from being associated with too many services, which facilitates the control of the sequence variables.

In some embodiments, one sequence variable can be shared by a plurality of services and used to generate random character strings for the plurality of services, thereby lowering the overheads of a database. In such case, all random character strings generated based on this sequence variable are unique in the scope of the plurality of services.

Furthermore, if a server generates random character strings for a plurality of services respectively, the character sets set for different services can also be different. Furthermore, after acquiring a value of a sequence variable corresponding to a service, the server can generate a random character string for the service on the basis of the character set for the service.

In some embodiments, the "mapping the sequence into a character string" in the step S102 can comprise: converting each basic numeral in the sequence to a character comprised in the character set and mapped to the basic numeral; according to the sequence of the characters in the sequence after conversion, connecting the characters in series to form a character string. The above sequence variable, seq, is used as an example again for description.

For example, seq is a sequence "123". Assuming that in a preset character set, the character mapped to the basic numeral "1" is '@', the character mapped to the basic numeral "2" is '#', and the character mapped to the basic numeral "3" is '$', these three characters can be connected sequentially in series to "@#$", and the sequence "123" can be mapped into the character string "@#$", In some embodiments, if a value of a sequence variable is acquired after a character set is preset, it may be necessary to convert the value into a different numeral system, such that a basic numeral set for expressing the value after conversion can have a one-to-one mapping relationship with the preset character set.

For example, when the number of characters contained in the character set is N, the basic numeral set is a basic numeral set corresponding to a base N numeral system, comprising the following basic numerals: integers 0 to N−1; wherein N is an integer no smaller than 2. In such a case, for the step S101, the "acquiring a value of a sequence variable in a database, wherein the value of the sequence variable is a sequence comprising basic numerals from a basic numeral set" can comprise: acquiring a value of a sequence variable in a database; in response to determining that the acquired value of the sequence variable is not a base-N number, converting the value of the sequence variable to a base-N number, the base-N number being a sequence comprising basic numerals in a basic numeral set corresponding to a base N numeral system. A description will be provided below through an example.

For example, assuming that a preset character set is {'r', '7', 'd', 'm', 'g', 'a', 'x', '3'}, comprising 8 characters (i.e., N=8), a one-to-one mapping relationship can be set between the characters contained in the character set and basic numerals contained in a basic numeral set corresponding to the octal system {'0', '1', '2', '3', '4', '5', '6', '7'}. Assuming that the one-to-one mapping relationship is expressed as {('r', '0'); ('7', '1'); ('d', '2'); ('m', '3'); ('g', '4'); ('a', '5'); ('x', '6'); ('3', '7')}, wherein each pair of parentheses comprises a mapping pair, and each mapping pair comprises a character contained in the character set and a basic numeral contained in the basic numeral set that map to each other.

Assuming that the acquired value of the sequence variable is a decimal number 11002, rather than an octal number, then the decimal number 11002 can be converted to an octal number 25372. Namely, the value of the sequence variable can be expressed as a sequence "25372" based on a basic numeral set corresponding to the octal system. Furthermore, the sequence "25372" can be converted, according to the character set and the one-to-one mapping relationship, to a character string "dam3d" as a random character string generated at the current time.

In some embodiments, each time when the step S101 is executed, an instruction can be used to allow an auto increment of the sequence variable, and then obtain the value of the sequence variable, such that a different value of the sequence variable is acquired each time. It has been mentioned above that currently in most databases, the instruction used to allow an auto increment of the sequence variable and then acquire the value of the sequence variable can comprise the NextVal instruction. In some embodiments, the name of the instruction is not limited, and "NextVal" is merely an example of the name of the instruction.

An exemplary implementation process of the method for generating a random character string will be described below.

Figure 2:
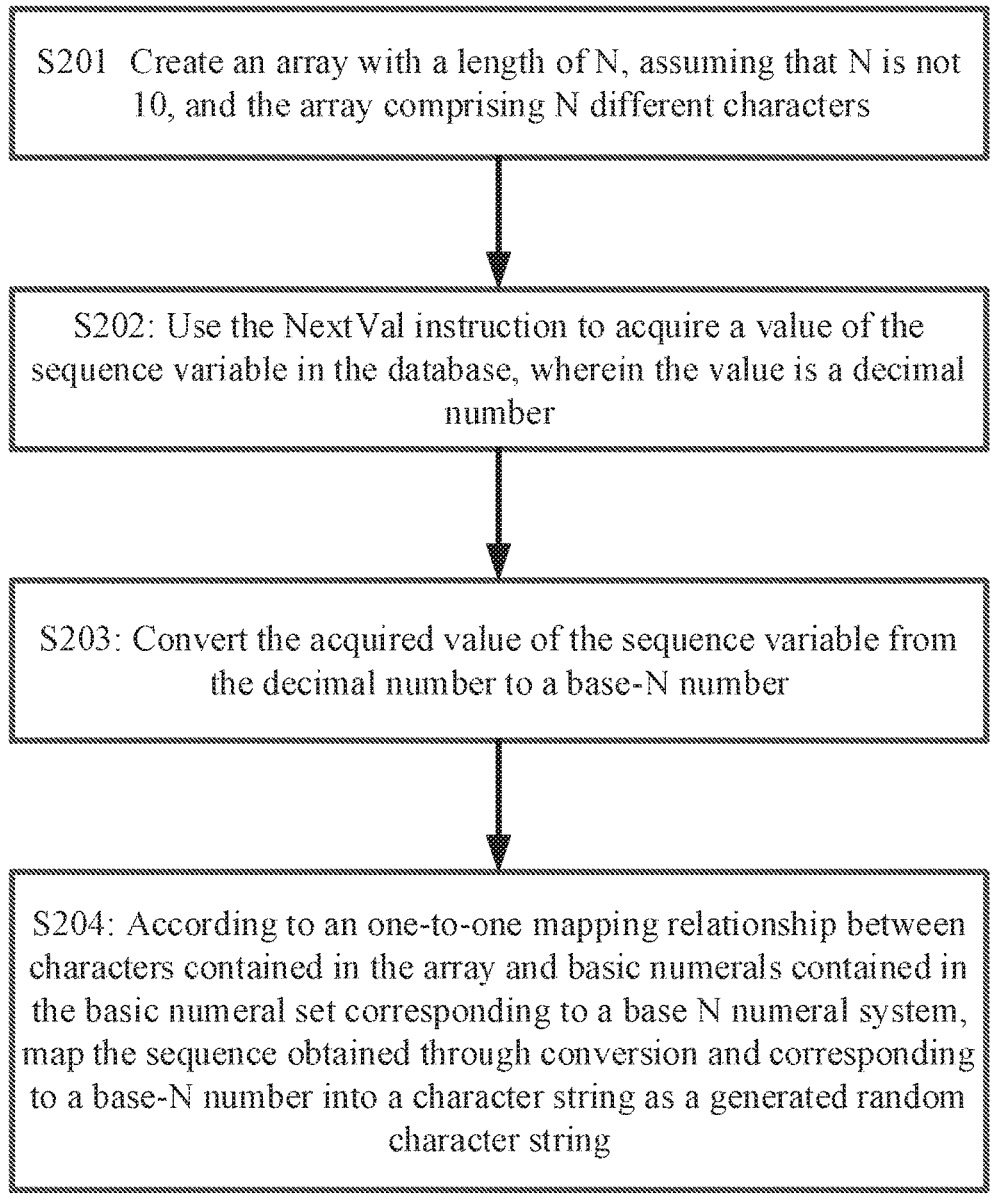
FIG. 2 illustrates an implementation process of the method for generating a random character string in a practical application scenario according to various embodiments of the present disclosure.

Assuming that the value of a sequence variable in a database is a decimal number by default, the number of characters contained in a preset character set is N, and the character set is created and saved in an array form in advance. As shown in FIG. 2, the process can comprise the following steps:

S201: creating an array with a length of N, assuming that N is not 10, and the array comprising N different characters.

The character set and the one-to-one mapping relationship in the example above will be used again. The array can be created by using the following instruction:

char[ ] digit ={'r', '7', 'd', 'g', 'a', 'x', '3'}.

S202: using the NextVal instruction to acquire a value of the sequence variable in the database, wherein the value is a decimal number.

It is assumed that the acquired value of the sequence variable is a decimal number 11002.

S203: converting the acquired value of the sequence variable from the decimal number to a base-N number.

Assuming that N=8, then the value of the sequence variable after conversion is an octal number 25372, and the corresponding sequence is "25372".

In some embodiments, if N=10, then the step S203 can be omitted as there is no need to execute the step.

S204: according to an one-to-one mapping relationship between characters contained in the array and the basic numerals contained in the basic numeral set corresponding to a base N numeral system, mapping the sequence obtained through conversion and corresponding to a base-N number into a character string as a generated random character string.

The sequence "25372"can be mapped into a character string "dam3d" as a generated random character string.

Figure 3:
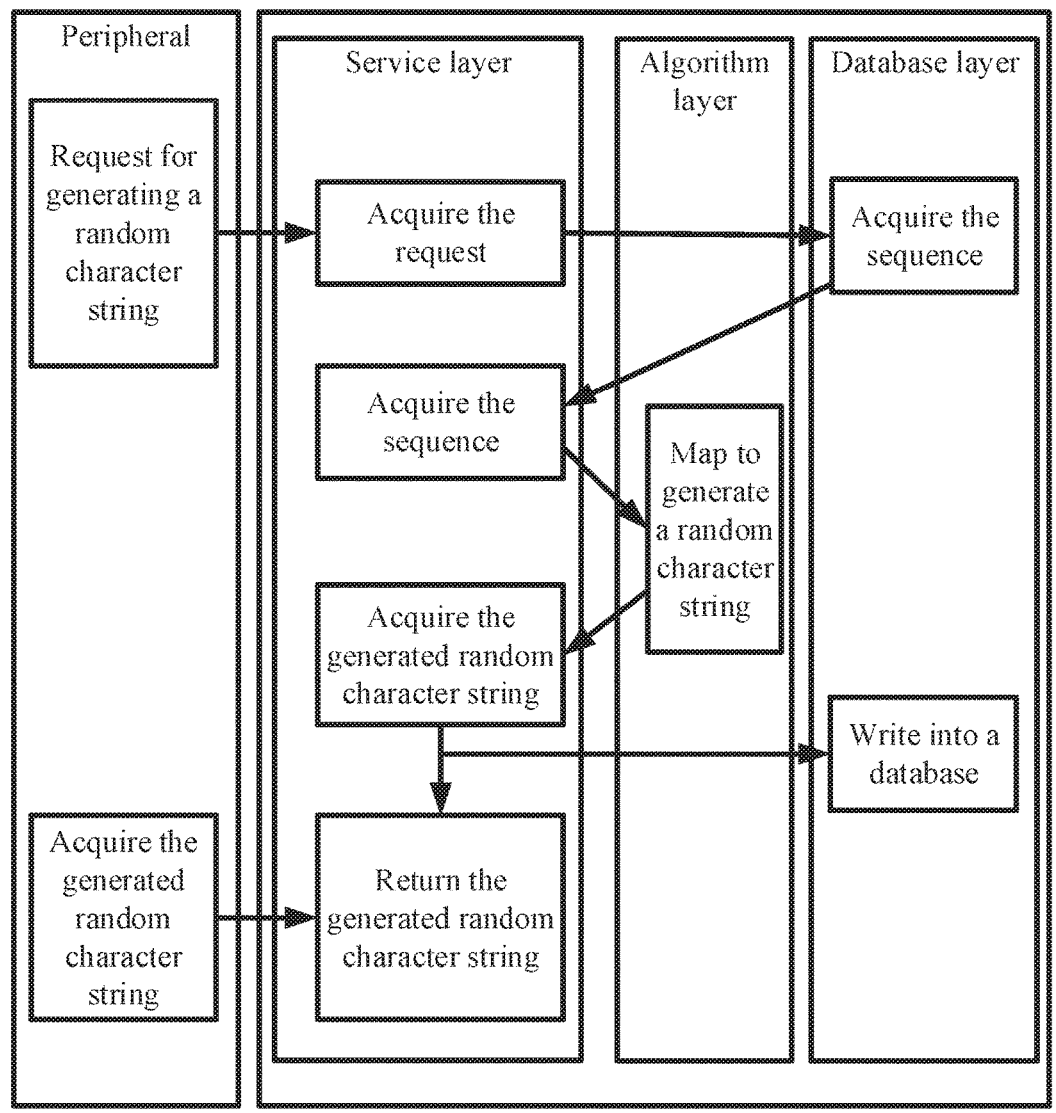
FIG. 3 is a structural diagram of a system for implementing the process in FIG. 2 according to various embodiments of the present disclosure.

Furthermore, in some embodiments, a structural diagram of the system for implementing the process in FIG. 2 is shown in FIG. 3.

The system can comprise a peripheral, a service layer, an algorithm layer, and a database layer. The processing logic of each layer can be implemented on the same device (e.g., a server) or can be implemented on different devices.

The line segments with arrows in FIG. 3 can indicate an execution sequence of a processing logic of the process of generating a random character string, and blocks connected by two ends of a line segment with an arrow include the description of a step in the process. The process can mainly comprise the following steps:

a peripheral device sends a generation request for generating a random character string to a service layer;

in response to the generation request, the service layer uses the NextVal instruction to acquire a value of a preset sequence variable that corresponds to the type of the generation request from a database layer, and the value is returned to the service layer;

the service layer transfers the value of the sequence variable to an algorithm layer;

on the basis of a preset character set, the algorithm layer maps a sequence corresponding to the value of the sequence variable into a random character string and returns the random character string to the service layer;

the service layer sends the generated random character string and other related information to the database, such that these data are written and saved in the database;

the service layer returns the generated random character string to the peripheral device;

the peripheral device acquires the generated random character string, and the process ends at this point.

FIG. 3 is a structural diagram of a system that can be used to implement the method according to the embodiments of the present disclosure, as described through an example. In some embodiments, there may be other systems for implementing the method that have different structures from that of the system above. The structure of the system for implementing the method is not limited in the embodiments of the present disclosure.

In some embodiments, in addition to the sequence variable in a database, alternative variables may be used to replace the sequence variable for implementing the solution according to the present disclosure. For example, the alternative variable can be a variable for recording the number of milliseconds of the system time, a variable for defining and maintaining the generation of a random character string, and the like.

In some embodiments, if the alternative variable is used to implement the solution according to the present disclosure, it may be necessary to execute an amending operation on the sequence variable each time when a value of the sequence variable is acquired, such that the value of the sequence variable acquired next time is different from values of the sequence variable acquired at any other times. For different variables, the cost for implementing the amending operation may be different. In some embodiments, the alternative variable can be selected to implement the solution according to the present disclosure.

The method for generating a random character string according to some embodiments of the present disclosure is described above. Correspondingly, embodiments of the present disclosure further provides an apparatus for generating a random character string, as shown in FIG. 4.

Figure 4:
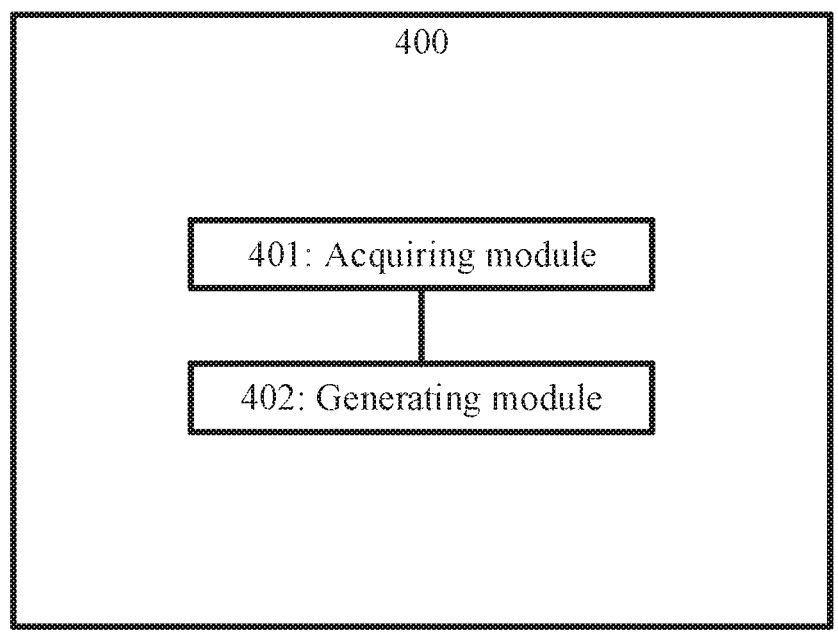
FIG. 4 is a schematic structural diagram of an apparatus for generating a random character string according to various embodiments of the present disclosure.

FIG. 4 is a schematic structural diagram of an apparatus 400 for generating a random character string according to some embodiments of the present disclosure, which comprises:

an acquiring module 401 configured to acquire a value of a sequence number variable in a database, wherein the value of the sequence variable is a sequence comprising basic numerals from a basic numeral set, and the acquired value of the sequence variable is different from values of the sequence variable acquired at any other times; and a generating module 402 configured to map the sequence into a character string as a generated random character string according to an one-to-one mapping relationship between characters contained in a character set and the basic numerals contained in the basic numeral set.

For example, the acquiring module 401 can be configured to receive a generation request for generating a random character string; according to the type of the generation request, determine a preset sequence variable that corresponds to the type from at least one sequence variable in the database; acquire a value of the sequence variable corresponding to the type, wherein the acquired value of the sequence variable is different from values of the sequence variable corresponding to the type that are acquired at any other times.

When the number of characters contained in the character set is N, the basic numeral set is a basic numeral set corresponding to a base N numeral system, comprising the following basic numerals: integers 0 to N−1; wherein N is an integer no smaller than 2.

For example, the acquiring module 401 can be configured to acquire a value of a sequence variable in a database; in response to determining that the acquired value of the sequence variable is not a base-N number, convert the value of the sequence variable to a base-N number, the base-N number being a sequence comprising basic numerals in a basic numeral set corresponding to a base N numeral system.

For example, the generating module can be configured to convert each basic numeral in the sequence to a character comprised in the character set and mapped to the basic numeral; according to the sequence of the characters in the sequence after conversion, connect the characters in series to form a character string.

For example, the acquiring module can be configured to acquire a value of the sequence variable by using an instruction that allows an auto increment of the sequence variable and then acquires the value of the sequence variable.

In some embodiments, the designated variable can be a sequence variable of a designated database or can be another variable such as a variable for recording the number of milliseconds of the system time.

In some embodiments, the apparatus 400 shown in FIG. 4 can be disposed on a terminal or a server. The various modules and units of the apparatus 400 may be implemented as software instructions. That is, the apparatus 400 may comprise a processor and a non-transitory computer-readable storage medium storing instructions that, when executed by the processor, cause the apparatus 400 to performed various steps and methods of the modules and units described above. The apparatus 400 may also be referred to as a system for generating a random character string. In some embodiments, the apparatus 800 may include a cell phone, a tablet computer, a PC, a laptop computer, a server, etc.

A person skilled in the art should understand that the embodiments of the present disclosure may be provided as a method, a system, or a computer program product. Therefore, the present disclosure may be implemented as a complete hardware embodiment, a complete software embodiment, or an embodiment combining software and hardware. Moreover, the present disclosure may be implemented in the form of a computer program product implemented on one or more computer usable storage media (including, but not limited to, a magnetic disk memory, CD-ROM, an optical memory, and the like) comprising computer usable program codes therein.

The present disclosure is described with reference to flowcharts and/or block diagrams of the method, device (system) and computer program product according to the embodiments of the present disclosure. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, such that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices, such that the instructions stored in the computer readable memory generate a manufactured article that includes an instruction apparatus. The instruction apparatus implements a function in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing a function in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

The terms of "including," "comprising," or any other variants thereof intend to encompass a non-exclusive inclusion, such that a process, method, commodity or device comprising a series of elements not only comprises these elements, but also comprises other elements that are not clearly listed, or further comprises elements that are inherent to the process, method, commodity or device. When there is no further restriction, elements defined by the statement "comprising one . . . " does not exclude additional similar elements in a process, method, commodity, or device that comprises the defined elements.

The embodiments of the present disclosure described above are merely exemplary and are not used to limit the present disclosure. To a person skilled in the art, the present disclosure may be modified or changed in various ways. Any modification, equivalent substitution or improvement made within the spirit and principle of the present disclosure shall fall within the scope of the claims of the present disclosure.

What is claimed is:

1. A method for generating a random character string, on a device, in response to a generation request from a peripheral device, comprising:

acquiring, at a service layer of the device, a value of a sequence variable in a database, wherein the acquired value of the sequence variable is a sequence comprising basic numerals from a basic numeral set, and the acquired value of the sequence variable is incremented from a previous value of the sequence variable, the acquired value being different from values of the sequence variable acquired at any other times; and mapping, at an algorithm layer of the device, the sequence variable into a character string as a generated random character string according to a one-to-one mapping relationship between characters contained in a character set and the basic numerals contained in the basic numeral set.

2. The method according to claim 1, wherein the acquiring a value of a sequence variable in a database comprises:

receiving a generation request for generating a random character string;

according to a type of the generation request, determining a preset sequence variable that corresponds to the type from at least one sequence variable in the database; and acquiring a value of the sequence variable corresponding to the type, wherein the acquired value of the sequence variable is different from values of the sequence variable corresponding to the type that are acquired at any other times.

3. The method according to claim 1, wherein: a number of the characters contained in the character set is N, the basic numeral set is a basic numeral set corresponding to a base N numeral system, comprising the basic numerals of integers 0 to N−1, and N is an integer no smaller than 2.

4. The method according to claim 3, wherein the acquiring a value of a sequence variable in a database, wherein the value of the sequence variable is a sequence comprising basic numerals from a basic numeral set comprises:

acquiring the value of the sequence variable in the database; and in response to determining that the acquired value of the sequence variable is not a base-N number, converting the value of the sequence variable to a base-N number, the base-N number being a sequence comprising the basic numerals in the basic numeral set corresponding to the base N numeral system.

5. The method according to claim 1, wherein the mapping the sequence into a character string comprises:

converting each basic numeral in the sequence to a character comprised in the character set and mapped to the basic numeral; and according to a sequence of the characters in the sequence after conversion, connecting the characters in series to form a character string.

6. The method according to claim 1, wherein the acquiring a value of the sequence variable comprises:

acquiring the value of the sequence variable by using an instruction that allows an auto increment of the sequence variable and then acquires the value of the sequence variable.

7. The method according to claim 1, wherein the instruction comprises a NextVal instruction.

8. A non-transitory computer-readable storage medium storing instructions that, when executed by a processor, cause the processor to perform a method for generating a random character string, on a device, in response to a generation request from a peripheral device, the method comprising:

acquiring, at a service layer of the device, a value of a sequence variable in a database, wherein the acquired value of the sequence variable is a sequence comprising basic numerals from a basic numeral set, and the acquired value of the sequence variable is incremented from a previous value of the sequence variable, the acquired value being different from values of the sequence variable acquired at any other times; and mapping, at an algorithm layer of the device, the sequence variable into a character string as a generated random character string according to a one-to-one mapping relationship between characters contained in a character set and the basic numerals contained in the basic numeral set.

9. The non-transitory computer-readable storage medium according to claim 8, wherein the acquiring a value of a sequence variable in a database comprises:
receiving a generation request for generating a random character string;
according to a type of the generation request, determining a preset sequence variable that corresponds to the type from at least one sequence variable in the database; and
acquiring a value of the sequence variable corresponding to the type, wherein the acquired value of the sequence variable is different from values of the sequence variable corresponding to the type that are acquired at any other times.

10. The non-transitory computer-readable storage medium according to claim 8, wherein: a number of the characters contained in the character set is N, the basic numeral set is a basic numeral set corresponding to a base N numeral system, comprising the basic numerals of integers 0 to N−1, and N is an integer no smaller than 2.

11. The non-transitory computer-readable storage medium according to claim 10, wherein the acquiring a value of a sequence variable in a database, wherein the value of the sequence variable is a sequence comprising basic numerals from a basic numeral set comprises:
acquiring the value of the sequence variable in the database; and
in response to determining that the acquired value of the sequence variable is not a base-N number, converting the value of the sequence variable to a base-N number, the base-N number being a sequence comprising the basic numerals in the basic numeral set corresponding to the base N numeral system.

12. The non-transitory computer-readable storage medium according to claim 8, wherein the mapping the sequence into a character string comprises:
converting each basic numeral in the sequence to a character comprised in the character set and mapped to the basic numeral; and
according to a sequence of the characters in the sequence after conversion, connecting the characters in series to form a character string.

13. The non-transitory computer-readable storage medium according to claim 8, wherein the acquiring a value of the sequence variable comprises:
acquiring the value of the sequence variable by using an instruction that allows an auto increment of the sequence variable and then acquires the value of the sequence variable.

14. The non-transitory computer-readable storage medium according to claim 8, wherein the instruction comprises a NextVal instruction.

15. A system comprising a peripheral device, a service layer, and an algorithm layer, for generating a random character string, comprising a processor and a non-transitory computer-readable storage medium storing instructions that, when executed by the processor, cause the system to perform a method for generating a random character string, the method comprising:
receiving, at a service layer, from the peripheral device, a generation request for generating a random character string;
in response to receiving the generation request, acquiring, at the service layer, a value of a sequence variable in a database, wherein the value of the sequence variable is a sequence comprising basic numerals from a basic numeral set, and the acquired value of the sequence variable is incremented from a previous value of the sequence variable, the acquired value being different from values of the sequence variable acquired at any other times; and
mapping, at the algorithm layer, the sequence variable into a character string as a generated random character string according to a one-to-one mapping relationship between characters contained in a character set and the basic numerals contained in the basic numeral set.

16. The system according to claim 15, wherein the acquiring a value of a sequence variable in a database comprises:
receiving a generation request for generating a random character string;
according to a type of the generation request, determining a preset sequence variable that corresponds to the type from at least one sequence variable in the database; and
acquiring a value of the sequence variable corresponding to the type, wherein the acquired value of the sequence variable is different from values of the sequence variable corresponding to the type that are acquired at any other times.

17. The system according to claim 15, wherein: a number of the characters contained in the character set is N, the basic numeral set is a basic numeral set corresponding to a base N numeral system, comprising the basic numerals of integers 0 to N−1, and N is an integer no smaller than 2.

18. The system according to claim 17, wherein the acquiring a value of a sequence variable in a database, wherein the value of the sequence variable is a sequence comprising basic numerals from a basic numeral set comprises:
acquiring the value of the sequence variable in the database; and
in response to determining that the acquired value of the sequence variable is not a base-N number, converting the value of the sequence variable to a base-N number, the base-N number being a sequence comprising the basic numerals in the basic numeral set corresponding to the base N numeral system.

19. The system according to claim 15, wherein the mapping the sequence into a character string comprises:
converting each basic numeral in the sequence to a character comprised in the character set and mapped to the basic numeral; and
according to a sequence of the characters in the sequence after conversion, connecting the characters in series to form a character string.

20. The system according to claim 15, wherein the acquiring a value of the sequence variable comprises:
acquiring the value of the sequence variable by using an instruction that allows an auto increment of the sequence variable and then acquires the value of the sequence variable.

* * * * *